Dec. 3, 1935.  W. H. DE LANCEY  2,022,932
LIQUID DISPENSING APPARATUS
Filed May 26, 1934   6 Sheets-Sheet 1
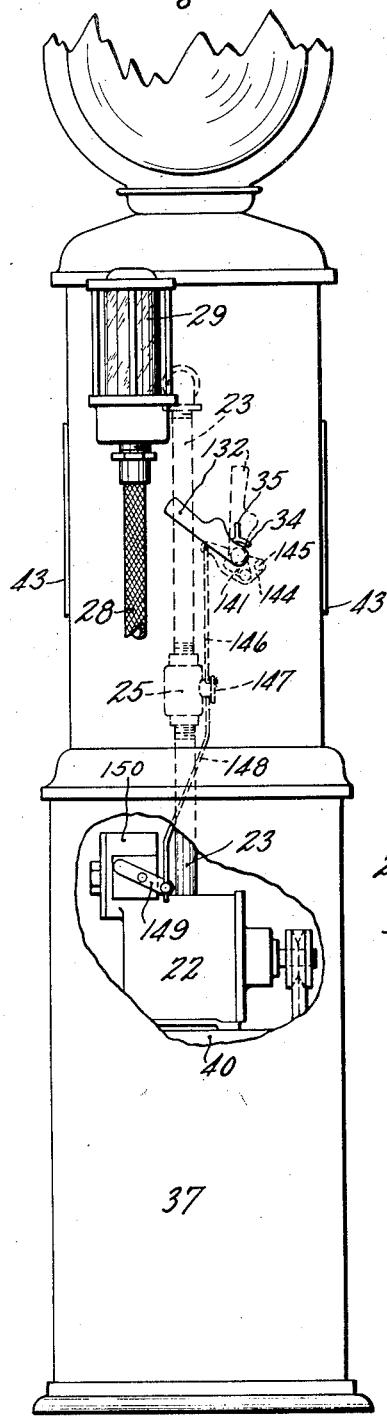
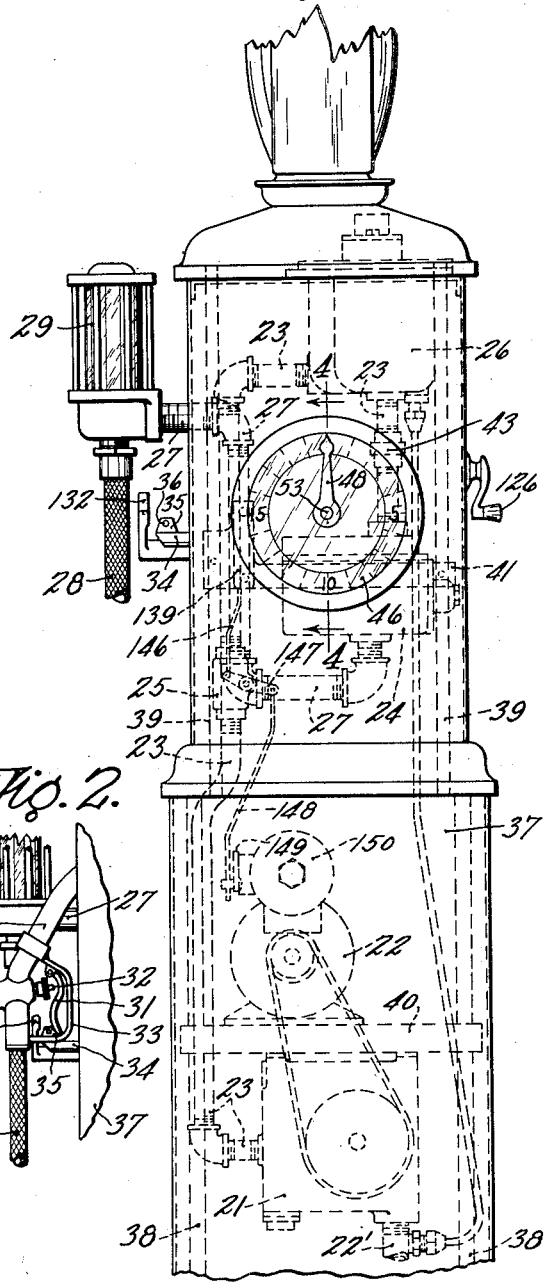
INVENTOR
WARREN H. DE LANCEY
BY Chapin & Neal
ATTORNEYS

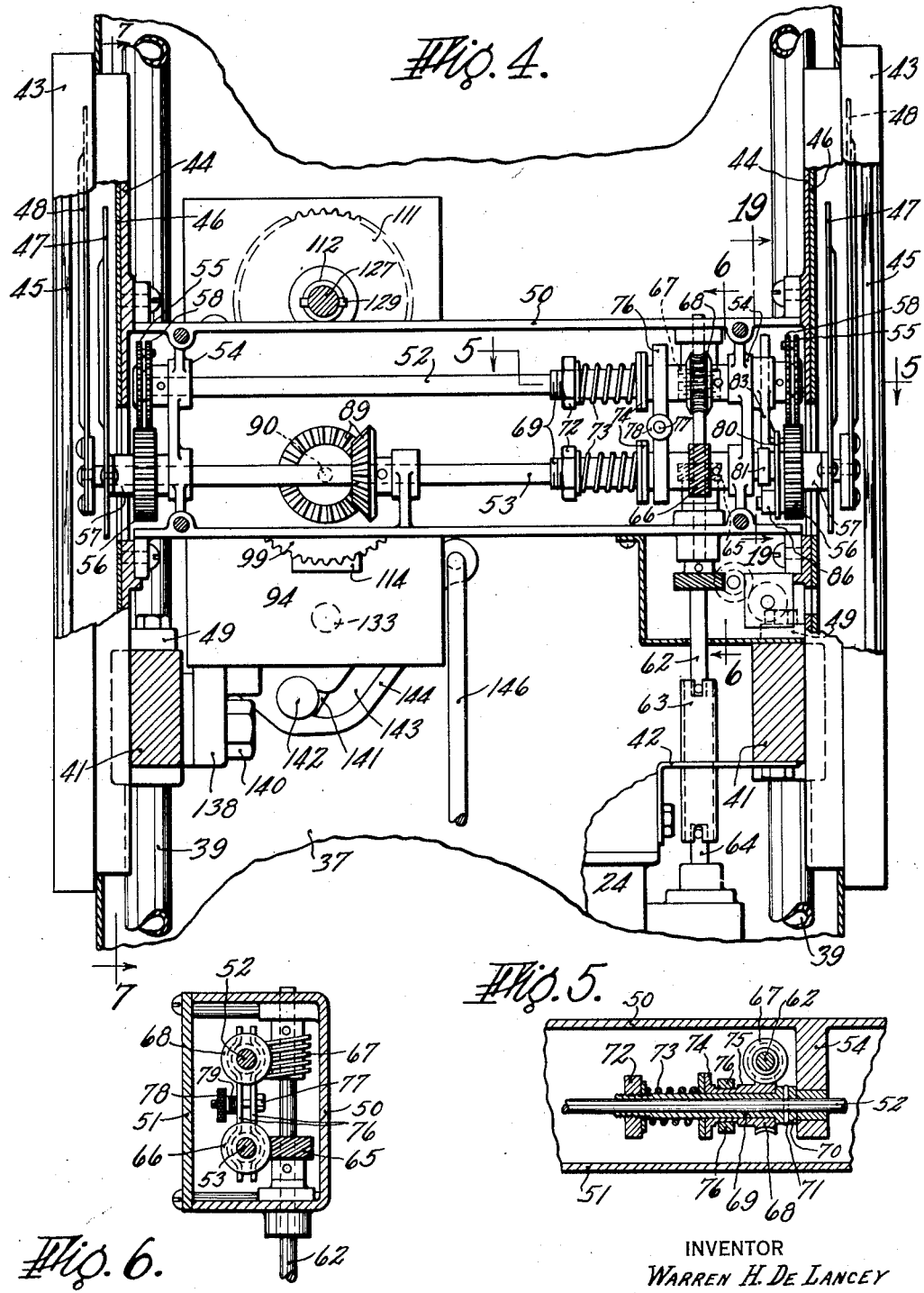

Dec. 3, 1935.   W. H. DE LANCEY   2,022,932
LIQUID DISPENSING APPARATUS
Filed May 26, 1934   6 Sheets-Sheet 3
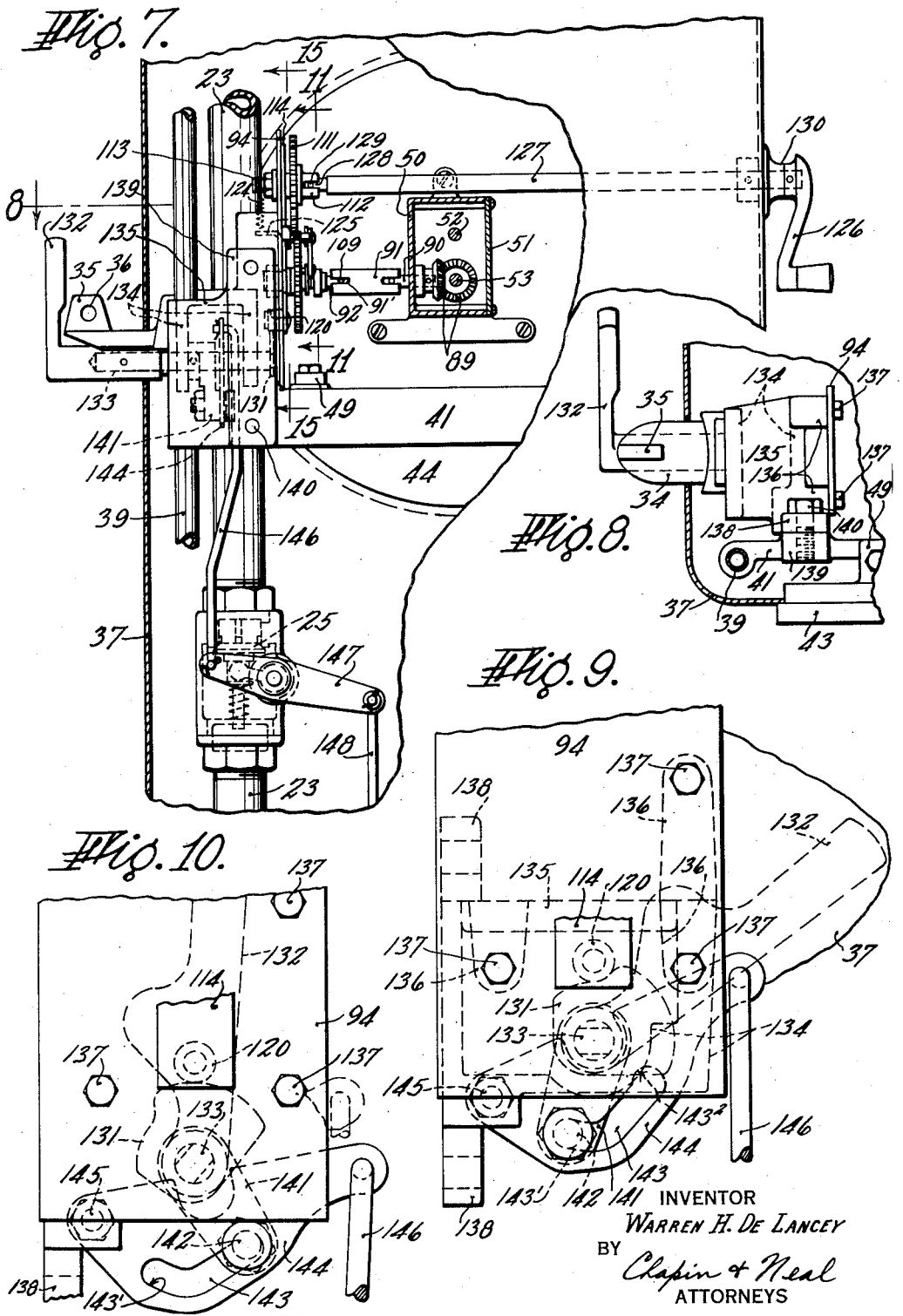
INVENTOR
WARREN H. DE LANCEY
BY Chapin & Neal
ATTORNEYS Dec. 3, 1935. W. H. DE LANCEY 2,022,932
LIQUID DISPENSING APPARATUS
Filed May 26, 1934 6 Sheets-Sheet 4
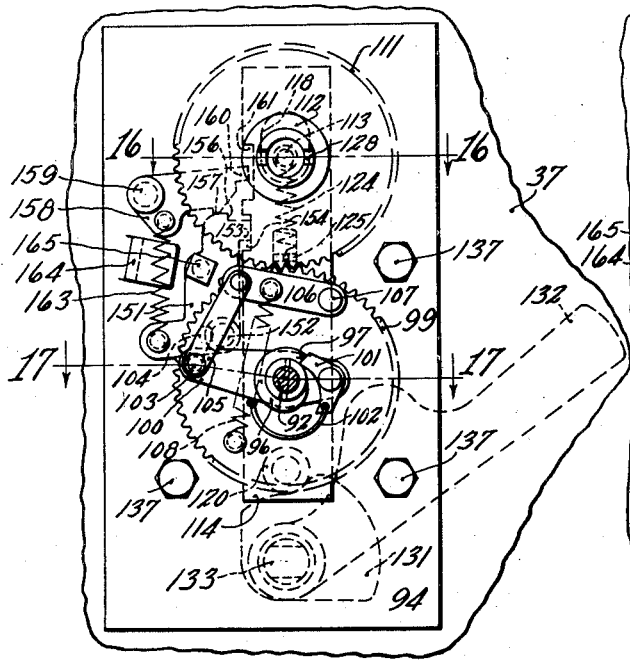
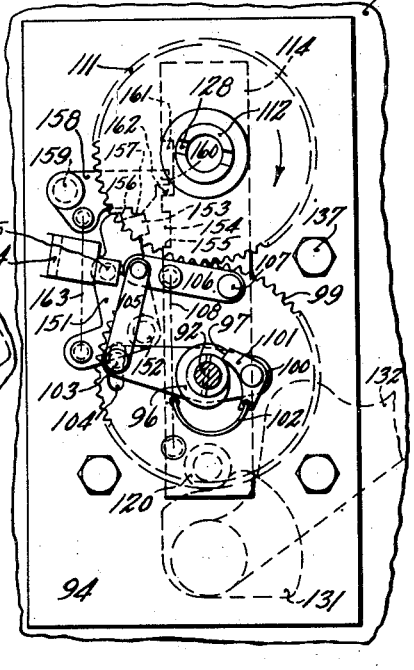
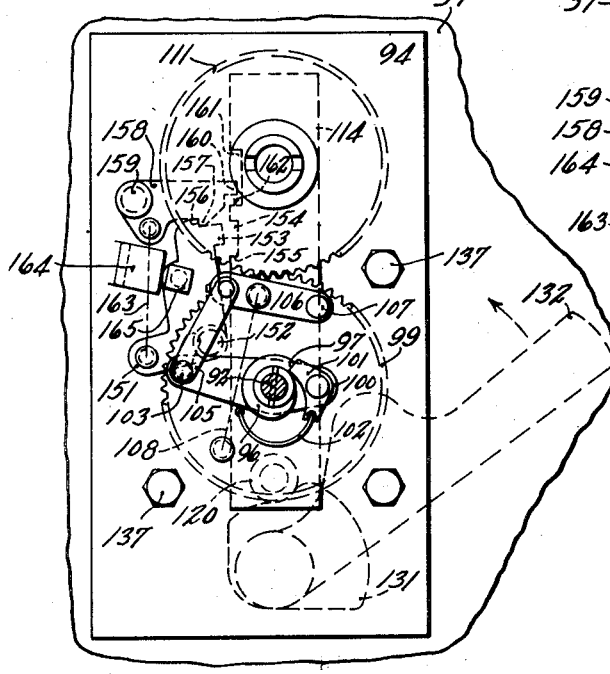
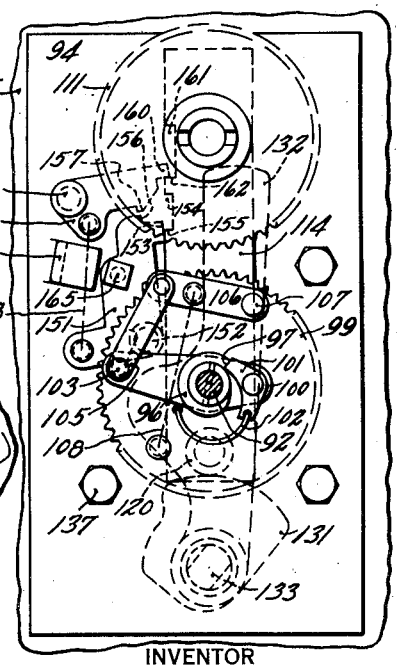
INVENTOR
*Warren H. De Lancey*
BY
*Chapin & Neal*
ATTORNEYS Dec. 3, 1935.     W. H. DE LANCEY     2,022,932
LIQUID DISPENSING APPARATUS
Filed May 26, 1934     6 Sheets-Sheet 5
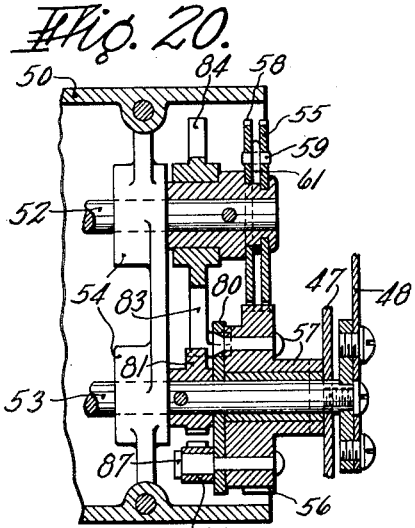
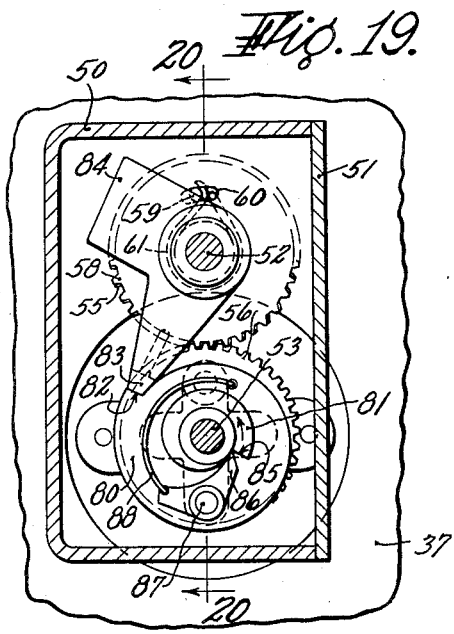
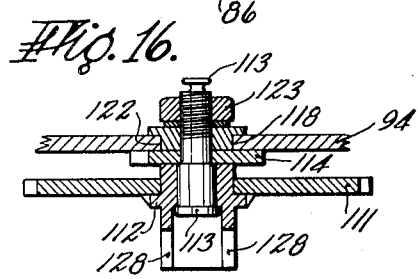
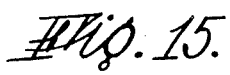
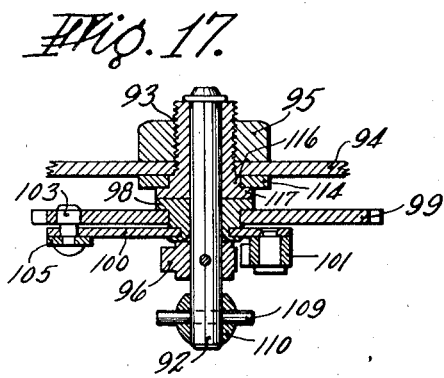
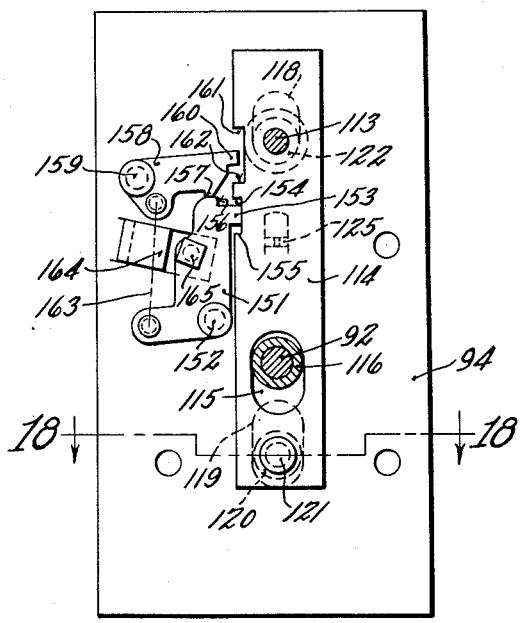
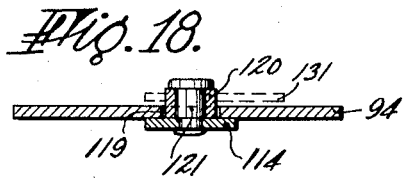
INVENTOR
WARREN H. DE LANCEY
BY Chapin & Neal
ATTORNEYS Dec. 3, 1935.  W. H. DE LANCEY  2,022,932
LIQUID DISPENSING APPARATUS
Filed May 26, 1934  6 Sheets—Sheet 6
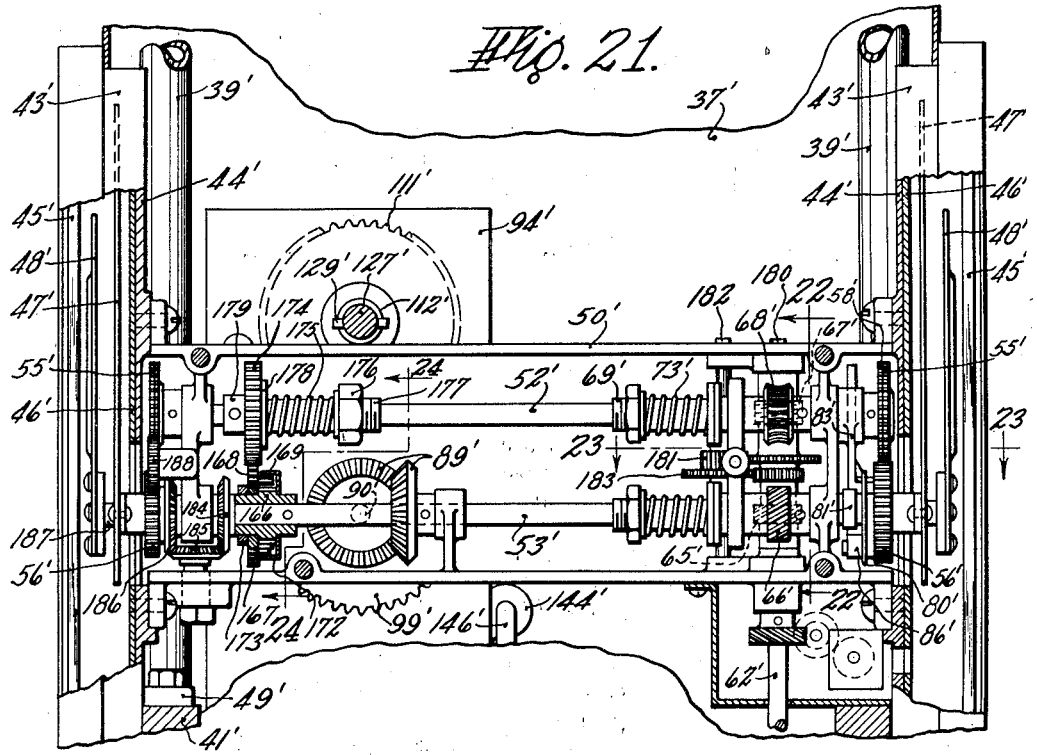
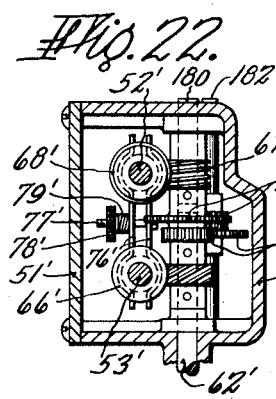
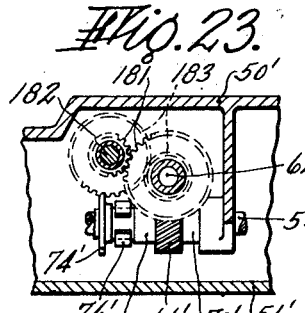
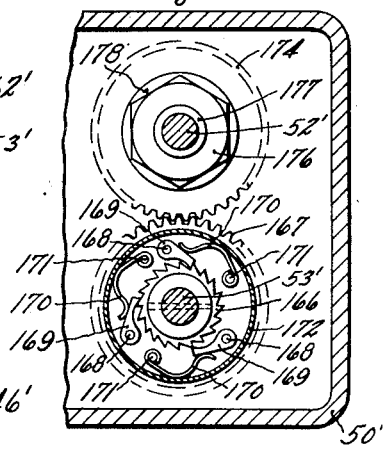
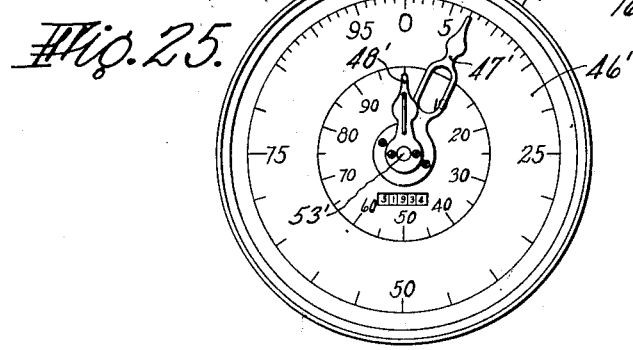
INVENTOR
WARREN H. DE LANCEY
BY
Chapin & Neal
ATTORNEYS Patented Dec. 3, 1935

2,022,932

UNITED STATES PATENT OFFICE 2,022,932

LIQUID DISPENSING APPARATUS

Warren H. De Lancey, Springfield, Mass., assignor to Gilbert & Barker Manufacturing Company, West Springfield, Mass., a corporation of Massachusetts Application May 26, 1934, Serial No. 727,683

12 Claims. (Cl. 221—95)

This invention relates to improvements in liquid dispensing apparatus of the so-called meter type, such as is now commonly used for dispensing gasoline, oils and the like.

The invention is directed to the problem of compelling the resetting of the movable, quantity-indicating element of the meter as a condition precedent to operation of the pump and dispensing of liquid from the apparatus.

The invention has for an object the provision of a generally simplified, improved and substantially fool-proof means for accomplishing the above purpose.

More particularly, the invention has for an object the provision of locking means, which normally hold the control element of the liquid pumping means in inactive position to prevent pumping, and means actuated by the resetting means for the register of the meter and only after the register has been completely reset to zero, to release such locking means, whereupon the control element may be moved to active position to start the pumping means. When the control element is moved into its inactive position, it is automatically held by the locking means and cannot then be moved sufficiently to operate the pumping means in any way. Such element can then be moved only by releasing the locking means and this can only be effected after the register has been completely reset.

Other objects will appear as the detailed description proceeds and will be pointed out in the appended claims.

The invention will be disclosed with reference to the accompanying drawings, in which:

Fig. 1 is a front elevational view of a meter type, gasoline dispensing apparatus embodying the invention;

Fig. 2 is a fragmentary view, taken similarly to Fig. 1 and showing the hose nozzle in place on its support;

Fig. 3 is a side elevational view of the apparatus with parts broken away to reveal the driving motor for the pump and the control for such motor;

Fig. 4 is a fragmentary cross sectional view taken on the line 4—4 of Fig. 1;

Figs. 5, 6 and 7 are cross sectional views taken on the lines 5—5, 6—6 and 7—7, respectively, of Fig. 4;

Fig. 8 is a fragmentary sectional plan view taken on the line 8—8 of Fig. 7;

Fig. 9 is a fragmentary view of the operating means for the flow control mechanism shown in "off" position;

Fig. 10 is a view similar to Fig. 9 but showing the flow control mechanism in "on" position;

Fig. 11 is a view taken on the line 11—11 of Fig. 7, showing the resetting mechanism and the interlock between such mechanism and the flow controlling means;

Figs. 12, 13 and 14 are views similar to Fig. 11 and illustrate successive stages in the operation of the interlocking means;

Fig. 15 is a sectional elevational view taken on the line 15—15 of Fig. 7;

Figs. 16 and 17 are sectional plan views taken on the lines 16—16 and 17—17 of Fig. 11;

Fig. 18 is a sectional plan view taken on the line 18—18 of Fig. 15;

Fig. 19 is a cross sectional view taken on the line 19—19 of Fig. 4;

Fig. 20 is a sectional view taken on the line 20—20 of Fig. 19;

Fig. 21 is a view similar to Fig. 4 and showing a modification;

Figs. 22, 23 and 24 are sectional views taken on the lines 22—22, 23—23 and 24—24, respectively, of Fig. 21; and Fig. 25 is an exterior view of the dial shown in Fig. 21.

Referring first to Fig. 1 of these drawings; there is shown more or less in conventional form, a power-driven gasoline dispensing apparatus of the so-called meter type. A suitable rotary pump 21, driven by an electric motor 22, draws gasoline through a suction pipe 22' from a suitable storage tank (not shown) and forces the liquid upwardly through piping 23 to a suitable meter 24. Interposed in piping 23 is a valve 25 and a device 26 for freeing the liquid of air just prior to the entrance of the liquid to the meter. The outlet of the meter is connected by piping 27 to a flexible hose 28, usually through the intermediary of a sight flow indicator 29. On the delivery end of the hose is a nozzle 30 (Fig. 2) having the usual self-closing valve and an operating lever 31 which, when moved to the left from the position shown, will engage and move the stem 32 of the nozzle valve and open the latter. The nozzle 30 also has a guard 33 for lever 31. When not in use, the nozzle is hung up by resting the lower portion of this guard 33 upon a fixed, shelf-like support 34 having an upstanding lug 35 which passes through a slot in such portion, and holds the nozzle against displacement on its support in all directions other than vertically upward. The lug 35 is perforated, as at 36, to receive a padlock whereby the nozzle may be locked to its support. The lug 35 may if desired serve also to block an opening movement of the valve lever 31 while the nozzle is hung up on its support as well be clear from Fig. 2.

The apparatus, except for the hose, its nozzle, the nozzle support, indicator 29, and a control member later to be described, is usually enclosed in a suitable housing such as the sheet metal casing 37. Within this housing is a suitable supporting frame, and, as herein shown, this frame includes lower and upper series of vertically disposed pipe columns 38 and 39, respectively. To the columns 38 is fixed a plate 40 supporting both the pump and motor. To the upper columns 39 are fixed two cross bars 41, one of which is shown completely in Fig. 1 and both of which appear in section in Fig. 4. These bars 41 serve to support the meter 24, as indicated in part by the brackets 42 (Figs. 1 and 4). They also support the registers and the driving and resetting means therefor.

One or more registers are provided to indicate the quantities of liquid dispensed. As shown in Fig. 4, two registers are provided, one on each of two opposite sides of the apparatus. Each register includes a short cylindrical casing 43, mounted in an opening in housing 37. Each casing 43 has a solid inner wall 44 and its outer wall 45 is transparent. Within the casing 43 is fixed a dial 46, having inner and outer series of graduations (Fig. 1) with which indicating hands 47 and 48, respectively, cooperate. The long hand 48 is intended to make one complete revolution for each unit quantity dispensed, while the short hand 47 shows on the inner graduated scale the number of such unit quantities dispensed.

On the rear wall 44 of each register are lugs 49 which rest upon and are bolted to the adjacent cross bar 41 (Figs. 4, 7, and 8). Extending between the two walls 44 and secured at its ends, one to each such wall, is a horizontally disposed cross member 50 of channel-shaped cross section. A cover plate 51 (Fig. 7) secured as indicated to member 50, cooperates therewith to form a housing for most of the register driving mechanism.

This mechanism is largely of the conventional type. It includes upper and lower horizontally-disposed shafts 52 and 53, mounted within the housing and in bearings 54 provided therein near each end thereof. The lower shaft 53 extends through the rear wall 44 of each register casing to drive the hands 48 which are fixed one to each end of the shaft. The upper shaft 52 terminates short of such walls and has fixed to each end in the manner shown in Fig. 20 a gear 55 which drives an underlying gear 56. Gear 56 is part of a sleeve 57 which is mounted to turn freely on shaft 53 and has fixed thereto the indicator hand 47. Preferably each gear 55 has associated therewith a second gear 58 of the same diameter and pitch. Each gear 58 is free to turn on shaft 52 to a limited extent. As shown in Figs. 19 and 20, a pin 59 on gear 55 passes through an arcuate slot 60 in gear 58 which slot limits the extent of relative movement of the gears. A spring 61 interconnecting the two gears and acting between pin 59 and one end of slot 60, tends to swing them apart so that their teeth do not line up. This arrangement is the usual one for taking up all backlash in the driving connections between shaft 52 and sleeve 57. Shafts 52 and 53 are driven from a vertical shaft 62 (Figs. 4 and 6) but at different rates and in opposite directions. As shown, the shaft 52 is driven at one twentieth the rate at which shaft 53 is driven. Shaft 62 is mounted in bearings in the upper and lower flanges of member 50 and its lower end is connected by a suitable flexible coupling 63 (Fig. 4) with the driven shaft 64 of meter 24. Fixed to shaft 62 (Fig. 6) is a spiral gear 65 which drives a similar gear 66 on shaft 53, and a worm 67 which drives a worm gear 68 on shaft 52. Gears 66 and 68 are connected to their respective shafts in the manner shown in Fig. 5 in connection with gear 68. Such gear is free to turn on a sleeve 69. One end of this sleeve has a flange 70 which is pinned at 71 to shaft 52. The other end of sleeve 69 is threaded to receive a nut 72. A spring 73, coiled around sleeve 69 acts between the adjustable abutment 72 and a flange 74 on the hub 75 of gear 68 to press the latter against flange 70. The gear 68 thus drives shaft 52 through the intermediary of a friction clutch and the gear 66 drives its shaft 53 in the same way. This enables both shafts 52 and 53 to be turned to reset hands 47 and 48 to zero without turning the gears 66 and 68 and shaft 62. The hub 75 is grooved (Fig. 5) to receive the substantially semi-circular ends of two friction plates 76. These plates are drawn together by a bolt 77 (Fig. 6) and nut 78, the latter acting on one plate 76 through the intermediary of a spring 79. This pair of plates acts as a friction drag for both gears 66 and 68. By having the friction device act on the gears rather than the shafts driven thereby, resetting of the pointers is accomplished with less effort because the shafts only need to be turned for this purpose and they are free from the drag of the friction device.

Stops are provided for each of the indicator hands. As shown in Figs. 19 and 20, one of the gears 56 has fixed to one side thereof a cam 80 and adjacent thereto and fixed to shaft 53 is a similar but smaller cam 81. The arrow shown in Fig. 19 indicates the direction of travel of the cams while being driven by the meter shaft 62. Shaft 53 will be turned in the opposite direction by means later to be described, to reset the hands to zero. When the hands are both at zero, the abrupt radial face 82 of cam 80 will be engaged by the end of a pawl 83, mounted to turn freely on shaft 52 and constantly urged by its weighted extension 84 into engagement with the spirally-shaped surface of the cam. Also, the corresponding face 85 of the correspondingly formed cam 81 will be engaged by the free end of a pawl 86, pivoted at 87 to gear 56 and urged by a spring 88 into engagement with the spiral surface of the cam. During operation of the meter, shaft 53 will turn in a counterclockwise direction as viewed in Fig. 19, and the face 85 of cam 81 will move away from pawl 86. Gear 56 will also turn in the same direction but at a slower speed and thus will carry the face 82 of cam 80 away from pawl 83. Shaft 53 will usually make several revolutions and the nature of cam 81 is such that it may do so. The cam 80 is similarly constructed for similar reasons although the indicator hand 47 will rarely make more than one complete revolution. The resetting of the hands is effected by turning shaft 53 in a direction opposite to that indicated by the arrows in Fig. 19. The first action is to turn cam 81 and thus the indicator 48 without moving gear 56 or the indicator 47. This action continues until the face 85 of cam 81 engages the free end of pawl 86, whereupon the gear 56 will be turned with shaft 53. On continued turning of shaft 53 in the same direction, gear 56 will be moved until the cam face 82 is arrested by the abutment with the free end of pawl 83. Both hands 47 and 48 will then be restored to zero position. Thus, in resetting, the indicator 48 is moved back until it overlies and coincides in position with the indicator 47. Then both indicators move in unison to zero position, the pawl 83 serving as the zero stop for both.

The shaft 53 is connected by bevel gears 89 (Figs. 4 and 7) to a short shaft 90, which is mounted in the rear wall of member 50. As shown in Fig. 7, the outer end of shaft 90 is connected by a flexible coupling 91 to one end of a second and substantially axially alined shaft 92. The latter is rotatably supported in a stud 93 (Fig. 17) which is clamped to a vertically disposed, flat, stationarily supported plate 94 by a nut 95. Fixed to this shaft is a ratchet 96 having a single tooth (Fig. 11) with an abrupt radial shoulder 97. Between the ratchet and stud 93, a flanged hub 98 is mounted to turn freely on shaft 92. Mounted to turn freely on hub 98 with one face engaging the flange thereof is a gear 99. That part of the hub 98 which projects beyond gear 99 is made of smaller diameter to receive an arm 100, which at one end pivotally supports a pawl 101 adapted to engage the ratchet 96. A bowed spring 102 (Fig. 11) connected at one end to gear 99 and at the other to pawl 101, tends to hold the latter against the spirally shaped surface of ratchet 96. The end of hub 98 (Fig. 17) is crimped over against the arm 100 to hold the latter in proper axial position and this arm serves to prevent undue axial displacement of gear 99. The other end of arm 100 has fixed thereto a pin 103 which extends into a slot 104 (Fig. 11) formed in gear 99 and curved concentrically with respect thereto. This pin 103 serves also as a pivot for one end of a link 105 which, at its other end, is pivotally connected to the free end of an arm 106 pivoted to gear 99 at 107. A spring 108 connects arm 106 to gear 99 and tends to hold this arm and link 105 and arm 100 in the positions illustrated wherein pin 103 engages one end of slot 104. The shaft 92 at all times turns with shaft 53, being directly connected therewith through the described coupling 91, shaft 90 and gearing 89. This coupling 91 is simply a tube with diametrically disposed slots 91' in each end, in which pins such as that shown at 109 in Fig. 17 are engaged. The inner periphery of the tube engages a ball element such as shown at 110.

The gear 99 and the parts carried thereby form part of the pointer resetting mechanism. Gear 99 may be turned, when required, by an overlying gear 111, which is mounted to slide vertically into and out of mesh with gear 99. This gear 111 (Fig. 16) is welded to a hub 112 which is mounted to turn on a stud 113 fixed to a slide 114. This slide lies contiguous with the inner face of the supporting plate 94 and near its lower end has a vertically elongated slot 115 (Fig. 15) to encompass a short, smooth, cylindrical portion 116 (see also Fig. 17) of stud 93 which serves as one guide for the slide. The flange 117 of stud 93 (Fig. 17) holds the slide 114 in place on plate 94. This plate 94 (Fig. 15) is provided with upper and lower vertically elongated slots 118 and 119, respectively. A roll 120 (Figs. 15 and 18) mounted on a stud 121, fixed to the lower end of slide 114, projects through and beyond the lower slot 119. A flanged cylindrical spacer 122 (Figs. 15 and 16) rides in the upper slot 118 and the flange thereof engages the outer face of plate 94. This spacer receives a portion of stud 113 and is clamped to slide 114 by a nut 123, threaded on the outer end of the stud. The slide 114 is thus slidably held to and guided on plate 94 and the slots 115, 118 and 119 afford freedom for it to move up and down within the necessary limits. A spring 124 (Fig. 7) is connected at one end to stud 113 and at the other end to a lug 125 struck out from plate 94. This spring tends to hold slide 114 in its lower position with gear 111 in mesh with gear 99.

For convenience in resetting the pointers of the register from outside the casing 37, a suitable handle 126 is provided. This handle is fixed to one end of a shaft 127 which extends across inside the casing to the gear 111. The inner end of this shaft is telescoped into the inner and hollow end of hub 112, which has diametrically disposed slots 128 to receive driving pins 129 radially fixed to shaft 127. The shaft 127, at its other end, is supported sufficiently loosely in a bearing 130 to enable its inner end to be raised readily by gear 111 when slide 94 is in raised position. When this slide is in lowered position to mesh gear 111 with gear 99, the axes of gear 111 and shaft 127 align, whereby the shaft may then be turned freely to rotate gear 111 and thus gear 99 and the parts carried thereby.

The slide 114 is raised and lowered by means of a cam 131 which cooperates with the roll 120, already described. This cam is turned by a lever 132 which operates the flow control mechanism. Figs. 9 and 10 clearly show the slide 114 in lowered and raised positions, respectively. The control lever 132 is fixed to the outer end of a shaft 133 (Fig. 7) which is rotatably supported in two depending parts 134 of a bracket 135. To the outer face of the outermost part 134 is secured the hose nozzle support 35 (Figs. 7 and 8). Projecting from the inner face of the innermost part 134 are bosses 136 (Fig. 8) to which the plate 94 is secured by cap screws 137. The bracket 135 has flanges 138 which abut an upstanding flange 139 on the described cross bar 41 and are secured thereto by cap screws 140. On the inner end of shaft is fixed the cam 131 and also fixed to this shaft, at a point between the bearing parts 134, is a crank arm 141 to the free end of which is fixed a stud affording a crank pin 142 to ride in the slot 143 of an arm 144, pivoted at 145 to bracket 135. The free end of arm 144 is connected by a link 146 (Fig. 7) to the operating lever 147 of valve 25 and such lever is connected by a link 148 (Figs. 1 and 3) to the operating lever 149 of a switch 150 which is adapted to start and stop the driving motor 22 of pump 21.

When lever 132 is in the full line position shown in Fig. 3, the valve 25 is closed and switch 150 is open. It will be seen that the lever 132 must be moved to such position before the hose nozzle can be placed on the support 34. It will also be seen from Fig. 2 that when the hose nozzle is in place on support 34, it prevents movement of lever 132 into the dotted line and vertical position illustrated in Fig. 3, whereby operation of the dispensing apparatus is then prevented. When the lever 132 is in its vertical position, the valve 25 is open and switch 150 is closed, whereby the pump 21 is in operation and liquid may be dispensed from nozzle 30 whenever its valve is opened. It will also be seen that when the lever 132 is moved from the "off" position shown in Fig. 11 to the "on" position shown in Fig. 14, the slide 114 is raised and gear 111 is disengaged from gear 99.

To guard against improper operation of the apparatus, locking means shown in Figs. 11 to 15 are provided for the slide 114. A locking pawl 151 is pivoted to plate 94 at 152 and has a locking tooth 153, adapted to engage in a notch 154 in one vertical side edge of the slide 114. This tooth 153 will be engaged by a shoulder 155 on the slide before the latter can be lifted far enough to open valve 25 or close switch 150. The pawl 151 has at its upper end a shoulder 156 adapted to be engaged by the tooth 157 of a latch arm 158, pivoted to plate 94 at 159. This latch arm 158 also has a tooth 160 adapted to project into a notch 161 in slide 114. A shoulder 162 at one end of this notch is adapted to engage and move tooth 160 and lift and release the latch, when the slide 114 is raised. A spring 163 interconnects the latch arm and locking pawl and tends to hold the tooth 153 against the notched side edge of slide 114 and the latch tooth 157 against the upper end of the pawl. A stop 164 fixed to plate 114 limits the extent of outward (counter-clockwise) movement of the pawl 151. The pawl 151 carries an abutment 165 adapted to be engaged by the free end of the arm 100, carried by gear 99.

The operation of the apparatus will next be described. Assuming that the apparatus has been stopped and the hose nozzle hung up on its support 34 as shown in Fig. 2, the control lever 132 is held in its inclined position (shown by full lines in Fig. 3 and in dotted lines in Figs. 9 and 11), the valve 25 has previously been closed and switch 150 opened because of the lowering of arm 144 caused by movement of the crank 141 which was moved by the lever 132 when it moved into its inclined position. So also, the movement of lever 132 into such position turned the cam 131 into the position shown in Figs. 9 and 11 and caused the lowering of slide 114 by spring 124. The locking tooth 153 of pawl 151 is engaged in the notch 154 of slide 114 and the gears 99 and 111 of the resetting transmission are in mesh as shown in Fig. 11. The only operation then possible is that of resetting of the pointers of the register to zero. Vertical movement of slide 114, to an extent sufficient to enable valve 25 to be opened and switch 150 to be closed, is prevented by the locking tooth 153 and its cooperating shoulder 155. This tooth can be withdrawn from notch 154 only after the register pointers have been reset to zero. This result is effected by continued movement of the resetting means, which is permitted to a limited degree by relatively yieldable parts in the resetting transmission, after the pointers have been arrested by the stops 83 and 86, above described, in zero position.

To reset the pointers, the handle 126 is turned. This rotates gear 111 and, since gear 111 is then in mesh with gear 99, the latter is turned. Rotation of gear 99 in a counterclockwise direction will, through pawl 101 which is engaged with the shoulder 97 of the single tooth ratchet 96, turn shaft 92 and thus through the connections described turn shaft 53 in the proper direction to reset the pointers. Should the operator turn the handle 126 in the wrong direction, either accidentally or in an attempt to advance rather than reset the pointers, the pawl 101 will move away from the ratchet and no movement of shaft 92 will result. The pawl 101 ordinarily moves with the gear and without movement relatively thereto because the spring 108 holds pin 103 at the lower end of slot 104. During the previous operation of the dispensing apparatus, the ratchet 96 moved away from the position shown in Fig. 11 and, in so moving turned gear 99 by means of pawl 101 and the connections described. After the gear 99 has been turned in a counterclockwise direction until the pointers have been restored to zero position, the parts are in the position shown in Fig. 11. The stops 83 and 86, above described, prevent further movement of shaft 53, and thus also shaft 92, in a counterclockwise direction. The ratchet 96 is thus held stationary.

Although the indicators 47 and 48 are now at zero position, the slide 114 is not yet unlocked. Continued movement of the resetting transmission is necessary for this purpose. Continued counterclockwise movement of gear 99 is made possible by the slot 104 and such continued movement of the gear effects the release of the slide 114, enabling it to be raised by lever 132 and the pump to be started. As the gear 99 continues its counterclockwise movement, after ratchet 92 has been stopped, the arm 106 is moved to the left and its left hand end engages the abutment 165 on pawl 151 and moves the latter into the position shown in Fig. 12, wherein the tooth 153 is withdrawn from notch 154, thus releasing slide 114 for vertically upward movement. At the same time the shoulder 156 on the pawl 151 has been moved to the left of the tooth 157 of latch 158, and that tooth has dropped down into position to engage the shoulder. After the parts have been moved into the positions shown in Fig. 12, the resetting handle cannot be turned any more in the same direction, its movement being arrested by the abutment of pawl 151 with stop 164. The operator will then release the handle, whereupon the gear 99 will be moved a little in a clockwise direction until the parts come to rest in the positions shown in Fig. 13. The spring 108, pulling down on arm 106 will cause gear 99 to turn until the lower end of slot 104 abuts pin 103. The impact of the engagement of parts 104 and 103 may even cause a somewhat greater clockwise movement of the gear 99 and in such case the arm 100 will then be moved with it. But the pawl 101 can move away from ratchet 96 and thus no shock can be imposed on the shaft 92, which is connected with the pointers of the register.

The locking pawl 151, having been withdrawn from locking engagement with slide 114, is held away from the slide by the latch arm 158, the tooth 157 of which engages the shoulder 156. The slide 114 may then be moved vertically upward by cam 131 and thus the control lever 132 is free to move from its "off" position shown in Figs. 9 and 13 to its "on" position shown in Figs. 10 and 14. It should be noted that the slot 143 in lever 144 has a dwell portion 143' at one end thereof and that this dwell enables the control lever 132 to be moved during a certain initial portion of its movement from the position of Figs. 9 and 13 toward that of Figs. 10 and 14 without moving the lever 144. The slide 114, which is lifted by cam 131, starts to rise immediately that the lever 132 is turned in the direction of the arrow shown in Fig. 13 and rises far enough to disengage gear 111 from gear 99 before the lever 144 begins to swing downwardly. This arrangement prevents the valve 25 from being opened in the least degree (even cracked from its seat) until the resetting gears are disengaged. It also, of course, prevents switch 150 from closing. After the slide 114 has moved upwardly a short distance, the shoulder 162 engages tooth 160 of latch 158 and lifts the tooth 157 away from shoulder 156 of pawl 151, thus releasing the latter and allowing it to be moved by spring 163 until its locking tooth 153 engages the side edge of slide 114 at a position below notch 154. Thus, the locking pawl is placed in readiness to again lock the slide when the latter is moved downwardly again.

The lever 132 had to be swung into the vertical position illustrated in Fig. 14 in order to move the slide 114 into the position there shown and such movement of the lever caused the switch 150 to be closed and valve 25 to be opened. A notch 143$^2$ is provided in the outer end of slot 143 to receive crank pin 142, when the parts are positioned as in Fig. 10 with the valve 25 opened and switch 150 closed. As will be clear from Fig. 7, the valve is of the spring loaded type and tends to move automatically to closed position. There is thus an upward thrust on rod 146 and to guard against accidental movement of lever 144 by this thrust the recess 143$^2$ is provided to hold the lever securely in the "on" position shown in Fig. 10.

The pump 21, having been started, liquid is dispensed through hose 28 and nozzle 30 in the usual way and the quantity dispensed is indicated on the register by the hands 47 and 48. As soon as the desired quantity has been dispensed, the operator will move lever 132 from the position shown in Figs. 10 and 14 to that shown in Figs. 9 and 11. He is compelled to so move lever 132 in order to hang up nozzle 30 on its support 34. This will move slide 114 downwardly and as the slide moves downwardly, the tooth 153 of the locking pawl 151 engages in notch 154 of the slide to lock the same against upward movement. This locking occurs before the resetting gears 99 and 111 are enmeshed. Also, the latch 158 drops down into position where it is again effective to hold the pawl 151 when it is again moved out of locking position. This movement of lever 132 also closes valve 25 and opens switch 150 and this operation is completely performed before the resetting gears engage. The pump is thus stopped and locked in stopped position. The resetting gears are also engaged and the pump cannot be unlocked until these resetting gears have been turned, as above described, to return both indicators 47 and 48 to zero and then moved an additional distance to release the pawl 151. One may swing the lever 132 upward from its "Off" position a short distance, but not enough to even crack open valve 25 or close switch 150 and although the resetting gears may be thus disengaged, the turning of the resetting handle 126 is futile. One must reengage these gears and turn handle 126 until the hands are returned to zero and then an additional amount before slide 114 can be lifted far enough to enable the pump to be started.

In some localities, objection is raised against the plan of resetting the indicator hands to zero in the manner described, to this extent, viz., that it is possible for one hand to be moved part way back to zero before any movement of the other hand occurs. The objection will best be understood from Fig. 25, which shows a register graduated in liters with the outer and shorter hand 48' indicating centiliters and the inner and longer hand 47' indicating liters. Assume that seven liters have been delivered, the hand 47' stands at 7 and the hand 48' at zero. Now, if the resetting is started according to the plan described, only the hand 47' will move at first and hand 48' will not move at all until hand 47' is moved into coincidence with it. Accordingly, a dishonest operator might by a partial operation of the resetting means turn hand 47' back, say to 95 centiliters, and stop. The register then indicates 7.95 liters, whereas only seven have been delivered. To guard against this possibility, the arrangement shown in Figs. 21 to 24 is used, and the purpose of such arrangement is to move both hands 47' and 48' simultaneously on the initial operation of the resetting mechanism. Thus, in the case just above described, the hand 48' would move back toward zero the instant hand 47' was moved and preferably at about the same speed. Hence, when hand 47' reached "95" on the register, hand 48' would have nearly reached "2". The indication would thus always be less than the quantity of liquid delivered.

To effect this result, the indicator shaft which is the one first turned by the restting means, is made to immediately turn the other indicator shaft. In Fig. 21, the construction is essentially the same as that already described except for the addition of means to overcome the objection just described and except for two minor changes, hereinafter described, which are desired on pumps intended for the European trade. But the register is of the same construction and the stops shown in Figs. 19 and 20 are used as before. Accordingly, parts in Fig. 21 which correspond with those described have been given the same reference numerals with the addition of a prime. On shaft 53' is fixed a ratchet 166 and mounted to turn freely on the hub thereof is a gear 167 which, as shown in Fig. 24, has projecting from one end face thereof three angularly spaced studs 168, each pivotally supporting a spring pressed pawl 169 adapted to engage the teeth of the ratchet. The springs 170 for the pawls are pivotally supported on pins 171 fixed to said face of the gear and they are forced to bear against the pawls by the periphery of a casing 172, which encompasses them together with the ratchet and pawls. Clockwise rotation of shaft 53' (in the direction in which it is driven by meter shaft 62') is permitted without moving gear 167 but when shaft 53' is turned counterclockwise to reset the pointers, one of the three pawls 169 will quickly engage the ratchet 166 and cause gear 167 to be turned. From Fig. 24 it will be noted that the spacing of the pawls is such that the maximum movement of shaft 53' possible before gear 167 is driven is no more than one-third of the length of one tooth of the ratchet. The gear 167 which is held against axial displacement between a collar 173 and a shoulder on the ratchet, drives a gear 174 which drives shaft 52' through a friction clutch of the same general form as that shown in Fig. 5. That is, a spring 175 acts against an adjustable abutment 176 on the threaded end of a sleeve 177 to press a friction disk 178 against one end face of gear 174, the other face thereof abutting a flange 179 on the sleeve and the sleeve being fixed to shaft 52'. The tension of spring 175 is so adjusted as to be greater than that of spring 73' on the same shaft so that the sleeve 69' will slip on worm gear 68'. Thus, in resetting, shaft 52' will initially turn with shaft 53' and continue to turn with it until the hand 47' is arrested in zero position by the engagement of the shoulder 82' on cam 80' with pawl 83'. Then, shaft 53' can continue to turn, without turning shaft 52' until the shoulder 85' of cam 81' abuts pawl 86'. Then both hands will be at zero.

In Fig. 21, the meter shaft 62' drives the shaft 53' through intermeshing spiral gears 65' and 66' as before, but it does not directly drive worm 67'. The latter is mounted on a separate shaft 180, the lower end of which is connected by spur gearing 181 with a parallel shaft 182 mounted in casing 50. Shaft 182 is connected by spur gearing 183 with the upper end of shaft 62'. The interposed gearing 181 and 183 effects the additional speed reduction necessary to make the registers indicate liters and fractions thereof instead of gallons and fractions thereof, as first described.

The other difference in the structure shown in Fig. 21 consists in the interposition between the drive shafts 52' and 53' and one of the registers of reversing gearing, so that the hands of both registers will be driven in the same (clockwise) direction during a dispensing operation. The shaft 53' drives the right hand indicator hand 47' as before, but the left hand indicator 47' is driven through reversing gearing, comprising a bevel gear 184 fixed on shaft 53', an idler bevel gear 185 mounted in casing 50 and a bevel gear 186 fixed on a short shaft 187 which is aligned with shaft 53' and carries the other indicator 47'. So also, in the drive from shaft 52' to the left hand indicator hand 48', the two spur gears 55' and 56' are made of smaller diameter and the former drives the latter through an idler gear 188 to secure the change in direction.

Thus, the invention provides an interlock between the pump controlling means and the register resetting means for preventing the delivery of liquid from the apparatus until the hands 47 and 48 of the register have been completely reset to zero. The pump cannot be started when these hands are even a slight distance away from zero position. They must be moved all the way into such position because the releasing means is effective only after the driving shafts of the register have been arrested by the stop 83. The arrangement effectually prevents operation to any degree of the pump and the resetting means at the same time and forces alternate operation of these elements. One cannot by improper manipulation of the resetting crank 126, retard the operation of the indicator hands during the pumping operation. Nor can one move the indicator hands ahead by turning the crank 126. Heretofore, a dishonest operator might, by rapidly moving the control lever 132 on and off, make the hands of the register creep ahead and indicate a quantity greater than had been delivered. Such practice is effectually stopped by this invention because the instant that the lever is moved far enough to start the apparatus, it is locked in "on" position and cannot be unlocked until after the hands 47 and 48 have been completely reset. The invention thus prevents errors in measurement, with the resulting fraud on the customer by improper manipulation of the pump control lever.

What I claim is:

1. In a liquid dispensing apparatus, a meter, a register having a movable indicator driven by the meter, means for resetting said indicator to zero position, means for effecting flow of liquid through the meter, a control element movable to start and stop said flow, locking means for holding said element in position to stop said flow, means to move said element into position to be held by said locking means, and means operable by continued operation of said resetting means after said indicator has been reset to zero position to release said locking means and release said element for movement into position to start said flow.

2. In a liquid dispensing apparatus, a meter, means for effecting flow of liquid therethrough, a control element movable to start and stop said flow, locking means automatically engageable with said element when moved into position to stop said flow to hold it in such position, a register including a rotatable quantity indicator driven by the meter, means for resetting said indicator to zero, a stop to positively arrest the indicator in zero position, said resetting means including as elements of the transmission for turning said indicator yieldably connected parts which are relatively movable after the indicator in its resetting movement is arrested by said stop, and means operable by such relative rotation to release said locking means and allow said element to be moved into position to start said flow.

3. In a liquid dispensing apparatus, a meter, means for effecting flow of liquid through the meter, a control element movable to start and stop said flow, locking means automatically engageable with said element when moved into position to stop said flow to hold it in such position, a movable indicator driven by the meter, means to reset said indicator to zero including a transmission element yieldably connected to the indicator and normally turning therewith but capable of turning relatively thereto after the indicator has been reset to zero, a stop to arrest the indicator when it reaches zero position and enable said transmission element to be turned relatively thereto, and means operable by said relative movement of said transmission element to release said locking means and allow said element to be moved to start said flow.

4. In a liquid dispensing apparatus, a meter, means for effecting flow of liquid through the meter, a control element movable to start and stop said flow, a movable indicator driven in one direction by the meter, a resetting transmission for moving said indicator in the other direction and restoring it to zero position, said transmission including a pair of gears, a slide on which one of said gears is mounted and by which it is movable into and out of mesh with the other gear, means automatically operable on movement of said slide into position to enmesh said gears to lock the slide in such position, connections between said slide and flow control element for holding the latter in position to stop said flow when said gears are engaged, and means operable only after said transmission has been actuated to reset said indicator to zero to release said locking means.

5. In a liquid dispensing apparatus, a meter, means for effecting flow of liquid through the meter, a control element movable to start and stop said flow, a movable indicator driven in one direction by the meter, a resetting transmission for moving said indicator in the other direction and restoring it to zero position, said transmission including two members which are relatively separable to render the transmission ineffective to reset said indicator, means including a part movable to and fro to effect engagement and disengagement of said members, means automatically operable on movement of said part into position to engage said members to lock the part in such position, connections between said part and element for holding the latter in position to stop said flow when said members are engaged, and means operable by said transmission and only after said indicator has been reset to zero to release said locking means.

6. In a liquid dispensing apparatus, a meter, means for effecting flow of liquid through the meter, a control element movable to start and stop said flow, a movable indicator driven in one direction by the meter, a resetting transmission for moving said indicator in the other direction and restoring it to zero position, a member interconnected with the flow control element to move back and forth therewith and operable to render said transmission effective or ineffective to reset said indicator accordingly as said element is positioned to stop or start said flow, a locking device yieldingly urged toward said member, said member having a recess so located as to receive said device when the member is moved into position to stop said flow, said device when engaged in said recess preventing the member from being moved sufficiently to start said flow, and means operable on continued movement of said transmission after said indicator has been moved to zero position to withdraw said device from said recess.

7. In a liquid dispensing apparatus, a meter, means for effecting flow of liquid through the meter, a control element movable to start and stop said flow, a movable indicator driven in one direction by the meter, a resetting transmission for moving said indicator in the other direction and restoring it to zero position, a member interconnected with the flow control element to move back and forth therewith and operable to render said transmission effective or ineffective to reset said indicator accordingly as said element is positioned to stop or start said flow, a locking device yieldingly urged toward said member, said member having a recess so located as to receive said device when the member is moved into position to stop said flow, said device when engaged in said recess preventing the member from being moved sufficiently to start said flow, means operable on continued movement of said transmission after said indicator has been moved to zero position to withdraw said device from said recess, a latch automatically engageable with the locking device when withdrawn to temporarily hold it in withdrawn position and prevent its reengagement in said recess until said member has been moved, and means on the member operable to release the latch from the locking device after the member has been moved sufficiently to enable said flow to be started.

8. In a liquid dispensing apparatus, a meter, means for effecting flow of liquid through the meter, a control element movable to start and stop said flow, a movable indicator driven in one direction by the meter, a resetting transmission for moving said indicator in the other direction and restoring it to zero position, a member interconnected with the flow control element to move back and forth therewith and operable to render said transmission effective or ineffective to reset said indicator accordingly as said element is positioned to stop or start said flow, a pivoted locking pawl, a pivoted latch for the pawl, resilient means tending to force the pawl against said member and the latch toward said pawl, said member having a recess located to receive the pawl when the member is in position to stop said flow and a shoulder in the path of which said latch is located and by which the latch is moved out of engagement with the pawl when the member is moved into position to start said flow, and means operable by said transmission after the indicator has been reset to zero to withdraw said pawl from said recess and into position to be engaged and held by said latch.

9. In a liquid dispensing apparatus, a meter, means for effecting flow of liquid through the meter, a control element movable to start and stop said flow, a movable indicator driven in one direction by the meter, a resetting transmission for moving said indicator in the other direction and restoring it to zero position, a member interconnected with said element to move therewith and operable to render said transmission effective or ineffective to reset said indicator accordingly as said element is positioned to stop or start said flow, a locking device engageable with said member when moved by said element into flow-stopping position to hold it thus positioned, said transmission including two yieldably connected parts normally turning with said indicator and one of which is movable after the other has been stopped by the arrival of said indicator at zero position, said movable part operable on continued movement of said transmission after said indicator has been reset to zero to engage said locking device and withdraw it from locking engagement with said member.

10. In a liquid dispensing apparatus, a meter, means for effecting flow of liquid through the meter, a control element movable to start and stop said flow, a movable indicator driven in one direction by the meter, a resetting transmission for moving said indicator in the other direction and restoring it to zero position, a member interconnected with said element to move therewith and operable to render said transmission effective or ineffective to reset said indicator accordingly as said element is positioned to stop or start said flow, a locking device engageable with said member when moved by said element into flow-stopping position to hold it thus positioned, said transmission including two parts mounted side by side and a shaft supporting both of them, one of said parts normally turning with said shaft and the other being free to turn thereon, a pin on one of said parts, the other of said parts having an arcuate slot to receive said pin and permit limited relative angular movement between the parts, resilient means normally holding said pin at one end of its slot, and means operable by the relative movement between said parts to withdraw said locking device from locking engagement with said member.

11. In a liquid dispensing apparatus, a meter, means for effecting flow of liquid through the meter, a control element movable to start and stop said flow, a movable indicator driven in one direction by the meter, a resetting transmission for moving said indicator in the other direction and restoring it to zero position, a member interconnected with said element to move therewith and operable to render said transmission effective or ineffective to reset said indicator accordingly as said element is positioned to stop or start said flow, a locking device engageable with said member when moved by said element into flow-stopping position to hold it thus positioned, said transmission including two parts mounted side by side and a shaft supporting both of them, one of said parts normally turning with said shaft and the other being free to turn thereon, a pin on one of said parts, the other of said parts having an arcuate slot to receive said pin and permit limited relative angular movement between the parts, resilient means normally holding said pin at one end of its slot, a pair of links pivotally interconnected at one end and disposed roughly at right angles, said links being pivotally connected at their other ends one to one of said parts and the other to the other of said parts, the interconnected ends of said links being movable beyond the peripheries of said parts on relative movement between such parts and into engagement with said locking device to withdraw the same from engagement with said member.

12. In liquid dispensing apparatus, a meter, means for effecting flow of liquid through the meter, a pair of rotatable indicators differentially driven by the meter one to indicate unit quantities and the other to indicate fractions of such quantities, a drive shaft for each indicator, a shaft driven by the meter, driving connections between the last named shaft and each indicator shaft including a slip connection enabling each indicator shaft to be turned without turning the meter shaft in order to reset the indicators to zero, and means interconnecting said shafts and operable only when one of them is turned in the direction necessary to reset its indicator to compel simultaneous resetting movement of the other shaft, whereby the initial resetting movement of either indicator is accompanied by a resetting movement of the other indicator.

WARREN H. DE LANCEY.